US009374150B2

(12) United States Patent
Raaf et al.

(10) Patent No.: US 9,374,150 B2
(45) Date of Patent: Jun. 21, 2016

(54) RESOURCE ALLOCATION SCHEME FOR A RELAY BACKHAUL LINK

(75) Inventors: Bernhard Raaf, Neuried (DE); Erlin Zeng, Beijing (CN); Hai Ming Wang, Beijing (CN); Gilles Charbit, Hampshire (GB)

(73) Assignee: Nokia Solutions and Networks Oy, Espoo (FI)

( * ) Notice: Subject to any disclaimer, the term of this patent is extended or adjusted under 35 U.S.C. 154(b) by 726 days.

(21) Appl. No.: 13/390,462

(22) PCT Filed: Aug. 14, 2009

(86) PCT No.: PCT/EP2009/060587
§ 371 (c)(1),
(2), (4) Date: Mar. 12, 2012

(87) PCT Pub. No.: WO2011/018123
PCT Pub. Date: Feb. 17, 2011

(65) Prior Publication Data
US 2012/0163287 A1    Jun. 28, 2012

(51) Int. Cl.
*H04W 4/00* (2009.01)
*H04B 7/155* (2006.01)

(52) U.S. Cl.
CPC ..................... *H04B 7/155* (2013.01)

(58) Field of Classification Search
USPC .......................... 370/329, 330, 331, 338, 315
See application file for complete search history.

(56) References Cited

U.S. PATENT DOCUMENTS

| 2010/0238845 | A1* | 9/2010  | Love et al. ................. 370/280 |
| 2010/0254301 | A1* | 10/2010 | Blankenship ....... H04W 72/085 370/315 |
| 2011/0194483 | A1* | 8/2011  | Ji et al. ......................... 370/315 |
| 2015/0055545 | A1* | 2/2015  | Palanki et al. ................ 370/312 |

OTHER PUBLICATIONS

R1-091990, "Design of Backhaul Control Channel for Type I Relay in LTE-A", 3GPP TSG RAN WG1 #57, San Francisco, USA, May 4-8, 2009, CATT, 4 pgs.
R1-092115, "Resource Allocation and Downlink Control Channel Structure for Relay Backhaul Link", 3GPP TSG RAN WG1 Meeting #57, San Francisco, USA May 4-8, 2009, LG Electronics, 7 pgs.
R1-092418, "Relay Link Control Signaling", 3GPP TSG RAN WG1 Meeting #57bis, Los Angeles, USA, Jun. 29-Jul. 3, 2009, 5 pgs.
R1-092468, "Control Channel of Backhaul Link", TSG-RAN WG1 #57bis, Los Angeles, US, Jun. 29-Jul. 3, 2009, ZTE, 7 pgs.
R1-092565, "Further Aspects of Control Channel for Relay Backhaul Link", 3GPP TSG RAN WG1 Meeting #57bis, Los Angeles, US, Jun. 29-Jul. 3, 2009, Nokia Siemens Networks, Nokia, 3 pgs.

(Continued)

*Primary Examiner* — Zewdu A Beyen
(74) *Attorney, Agent, or Firm* — Harrington & Smith

(57) ABSTRACT

An apparatus including at least one processor and at least one memory including computer program code the at least one memory and the computer program code configured to, with the at least one processor, cause the apparatus at least to perform: determining for a group of symbols at least one candidate transmission symbol position, wherein the group of symbols include a first symbol position part for backhaul downlink symbol positions and a second symbol position part including the at least one candidate transmission symbol position; and generating at least one further backhaul downlink symbol for the at least one candidate transmission symbol position.

28 Claims, 8 Drawing Sheets

(56) References Cited

OTHER PUBLICATIONS

R1-092638, "Relay Backhaul Design", 3GPP TSG RAN WG1 Meeting #57bis, Los Angeles, USA, Jun. 29-Jul. 4, 2009, Motorola, 3 pgs.
R1-092660, "Some considerations on Downlink Backhaul Control Design in type I relay", 3GPP TSG RAN WG1 Meeting #57bis, Los Angeles, USA, Jun. 29-Jul. 3, 2009, Samsung, 5 pgs.
3GPP TR 36.814, V1.3.0 (Jun. 2009), "$3^{rd}$ Generation Partnership Project; Technical Specification Group radio Access Network; Further Advancements for E-UTRA Physical Layer Aspects (Release 9)", 47 pgs.
3GPP TS 36.211, V8.5.0 (Dec. 2008), "$3^{rd}$ Generation Partnership Project; Technical Specification Group Radio Access network; Evolved Universal Terrestrial Radio Access (E-UTRA); Physical Channels and Modulation (Release 8)", 82 pgs.

* cited by examiner

RESOURCE ALLOCATION SCHEME FOR A RELAY BACKHAUL LINK

The present application relates to apparatus for communicating. In particular, but not exclusively limited to, the present application relates to apparatus for coordinating communication of base stations in local area cellular communication.

A communication system can be seen as a facility enabling communication sessions between two or more entities such as mobile communication devices and/or other stations associated with the communications system. A communications system and a compatible communications device typically operate in accordance with a given standard or specification which sets out the various entities associated with the system. For example, the standard or specification may define if a communication device is provided with a circuit switched carrier service or a packet switched carrier service or both. Communications protocols and/or parameters which shall be used for the connection are also typically defined. For example, the manner how the communication device can access the communication system and how communication shall be implemented between communicating devices, the elements of the communication network and/or other communication devices is typically based on predefined communication protocols.

In a wireless communication system, at least a part of the communication between at least two stations occurs over a wireless link. Examples of wireless systems include public land mobile networks (PLMN), satellite based communications systems and different wireless local networks, for example wireless local area networks (WLAN). The wireless system can be provided into cells, and are therefore often referred to as cellular systems.

A user can access the communication system by means of an appropriate communication device. A communication device of a user is often referred to as user equipment (UE). A communication device is provided with an appropriate signal receiving and transmitting arrangement for enabling communications with other parties. Typically a communication device is used for enabling the users thereof to receive and transmit communications such as speech and data. In wireless systems communication the devices provide a transceiver station that can communicate with a base station of an access network servicing at least one cell and/or another communications device. Depending on the context, a communication device or user equipment may also be considered as part of a communication system. In certain applications, for example in ad-hoc networks, the communication system can be based on use of a plurality of user equipment capable of communicating with each other.

The communication may comprise, for example, communication of data for carrying communications such as voice, electronic mail (email), text messages, multimedia and so on. Users may thus be offered and provided numerous services via their communication devices. Non-limiting examples of the services include two-way or multi-way calls, data communication or multimedia services or simply an access to a data communications network system such as the internet. The user may also be provided broadcast or multicast content. Non-limiting examples of the content include downloads, television and radio programmes, videos, advertisements, message alerts and other information.

The third generation partnership project (3GPP) is standardising an architecture known as the long-term evolution (LTE) of the universal mobile telecommunications system (UMTS) radio access technology. The aim is to achieve reduced latency, higher user data rates, improved system capacity and coverage and reduced cost for the operator. A further development of the long term evolution is referred to herein as LTE-Advanced. The LTE-Advanced (LTE-A) standards aim to provide further enhanced services by means of even higher data rates and lower latency with reduced costs. The various elements stated of the 3GPP LTE specifications are referred to as releases.

Since the new spectrum bands for international mobile telecommunications (IMT) contain higher frequency bands and LTE-A is aiming at a higher data rate coverage of a base station, which are also known as node B (NB), enhanced node B (eNB), or donor enhanced node B (DeNB), can be limited due to the high propagation loss and limited energy per bit. Relaying signals from these base stations has been proposed as a possibility to enlarge the coverage. Apart from the goal or coverage extension, introducing relays may also help in the provision of high bit rate coverage in a high shadowing environment, and reducing average radio-transmission power at the user equipment (UE). This may lead to longer battery life, enhanced cell capacity and effective through-put, for example increasing cell edge capacity, balancing cell load, enhancing overall performance, and reducing deployment costs of radio access networks (RAN).

The relaying would be provided by elements known as relay stations (RS) or relay nodes (RN). The relay nodes can be fixed or mobile.

The relay nodes may be inband or outband relay nodes, in other words the relay nodes may operate at the same frequencies as the base station or operate at different frequencies. In the currently envisaged systems, the type-1 relay node will be an inband relay node, in other words operating on the same frequencies as the base station for both uplinks and downlinks. Furthermore the currently envisaged systems operate the downlink (DL) backhaul, in other words the link from the base station to the relay node in a manner so that it may operate with long term evolution release-8 (R8) compliant devices. It does so by configuring the multimedia broadcast over a single frequency network (MBSFN) subframe structure within the relay network cell. In other words, in a subframe that is used for backhaul, the relay network will first transmit physical downlink control channel (PDCCH) symbols, the common reference signal (CRS) for its own cell and after that the relay network will switch to receive control information (R-PDCCH) and data (R-PDSCH) from the base station. Currently however, there are problems in efficient use of the transmission and reception of the downlink backhaul control and data information.

According to the 3GPP Release-8, the number of physical downlink control channel (PDCCH) symbols in an MBSFN subframe may be different for each of the relay nodes serviced by a single base station. For example, according to the standard, the table describing the physical control format indicator channel in 3GPP TS 36.211 Version 8.5.0 shows that some relay nodes may use either one or two PDCCH symbols at the beginning of the MBSFN subframe while some relay nodes may use a fixed number of PDCCH symbols (in this case, two symbols) per subframe.

The backhaul control of such systems has to be defined in such a way that all relay nodes being serviced by a single base station will be able to receive at the specified time. This leads to a resource efficiency issue which may be shown schematically in FIG. 5.

In FIG. 5 there is shown a base station transmission (DeNB Tx) 401, a first relay node (RN1) transmission 403 and a second relay node (RN2) transmission 405. The base station transmission may be considered to be divided into two parts. The base station transmission first part 411 is two symbols #0 and #1 comprising Release-8 control signalling such as physical downlink control channel (PDCCH), physical control format indicator channel (PCFICH) and Physical Hybrid ARQ Indicator channel (PHICH), and the second part 413 symbols #3 to the end of the subframe which comprise the downlink (DL) backhaul control signalling such as the relay versions of the above control channels (R-PDCCH, R-PCFICH and R-PHICH) and the DL backhaul data, the relay—physical downlink shared channel (R-PDSCH).

The relay node transmissions have a first part 421 which comprises one or two symbols #0 (and #1) of the relay node Release-8 control signalling PDCCH, PCFICH, PHICH, a guard period 423 for allowing the relay station to switch from transmitting to receiving and a second part 425 which comprises the reception of the downlink backhaul control signalling and data part operating from symbols #3 to the end of the subframe.

The efficiency issue arises in the situation where differing relay nodes serviced by a base station have different Release-8 control signalling symbols. In such examples the first relay node RN1 is only able to receive downlink backhaul data from the DeNB at the beginning of symbol #3, however the second relay node RN2 with a smaller number of PDCCH symbols wastes one symbol space per sub-frame as the base station only starts the DL backhaul transmissions at the symbol #3. For a subframe structure as currently envisaged with 14 symbols per sub-frame this loss of potential can greatly impact the resource efficiency of the system.

There is provided according to a first aspect of the invention a method comprising: determining for a group of symbols at least one candidate transmission symbol position, wherein the group of symbols comprise a first symbol position part for backhaul downlink symbol positions and a second symbol position part comprising the at least one candidate transmission symbol position; and generating at least one further backhaul downlink symbol for the at least one candidate transmission symbol position.

The second symbol position part may further comprise a part for third generation partnership project standards release 8 control signalling symbols.

The at least one further backhaul downlink symbol may comprise at least one of: a relay-physical downlink control channel data; and a relay-physical downlink shared channel data.

The method may further comprise: determining for a further group of symbols at least one candidate received symbol position wherein the further group of symbols comprise a first symbol position part for backhaul downlink symbol positions and a second symbol position part comprising the at least one candidate received symbol position, and wherein generating the at least one further backhaul downlink symbol further comprises generating at least one further backhaul downlink symbol for the at least one transmission candidate symbol position when the position is equal to the at least one candidate received symbol position.

Determining at least one candidate received symbol position may comprise receiving a candidate symbol report.

The method may further comprise: generating a candidate symbol report trigger.

The method may further comprise: generating an indicator for the at least one further backhaul downlink symbol.

The method may further comprise transmitting the at least one further backhaul downlink symbol in the at least one candidate transmission symbol position of the group of symbols.

According to a second aspect of the invention there is provided a method comprising: receiving, for a group of symbols comprising a first symbol position part for backhaul downlink symbol positions and a second symbol position part, at least one backhaul downlink symbol in the second symbol position part.

The at least one backhaul downlink symbol in the second symbol position part may comprise at least one of: a relay-physical downlink control channel data; and a relay-physical downlink shared channel data.

The method may further comprise generating a candidate symbol report, wherein the report indicates at least one candidate received symbol position in the second symbol position part group of received symbols.

The method may further comprise receiving a report trigger prior to generating the candidate symbol report.

The method may further comprise: receiving over a first period the group of symbols; transmitting over a second period a second group of symbols; wherein the second group of symbols are transmitted with symbols misaligned with the received symbols wherein the misalignment is equal to or greater than a switching period.

The switching period may comprise one of at least: a Tx-to-Rx switching period; and a Rx-to-Tx switching period.

The method may further comprise delaying the transmitting of the second group of symbols by the switching period.

The method may further comprise: advancing the timing of the transmitting of the second group of symbols by the switching period.

According to a third aspect of the invention there may be provided an apparatus comprising at least one processor and at least one memory including computer program code the at least one memory and the computer program code configured to, with the at least one processor, cause the apparatus at least to perform: determining for a group of symbols at least one candidate transmission symbol position, wherein the group of symbols comprise a first symbol position part for backhaul downlink symbol positions and a second symbol position part comprising the at least one candidate transmission symbol position; and generating at least one further backhaul downlink symbol for the at least one candidate transmission symbol position.

The second symbol position part may further comprise a part for third generation partnership project standards release 8 control signalling symbols.

The at least one further backhaul downlink symbol may comprise at least one of: a relay-physical downlink control channel data; and a relay-physical downlink shared channel data.

The at least one memory and the computer program code configured to, with the at least one processor, may cause the apparatus at least to further perform: determining for a further group of symbols at least one candidate received symbol position wherein the further group of symbols comprise a first symbol position part for backhaul downlink symbol positions and a second symbol position part comprising the at least one candidate received symbol position, and wherein generating the at least one further backhaul downlink symbol further comprises generating at least one further backhaul downlink symbol for the at least one transmission candidate symbol position when the position is equal to the at least one candidate received symbol position.

Determining at least one candidate received symbol position may comprise receiving a candidate symbol report.

The at least one memory and the computer program code configured to, with the at least one processor, may cause the apparatus at least to further perform generating a candidate symbol report trigger.

The at least one memory and the computer program code configured to, with the at least one processor, may cause the apparatus at least to further perform generating an indicator for the at least one further backhaul downlink symbol.

The at least one memory and the computer program code configured to, with the at least one processor, may cause the apparatus at least to further perform transmitting the at least one further backhaul downlink symbol in the at least one candidate transmission symbol position of the group of symbols.

According to a fourth aspect of the invention there may be provided an apparatus comprising at least one processor and at least one memory including computer program code the at least one memory and the computer program code configured to, with the at least one processor, cause the apparatus at least to perform receiving, for a group of symbols comprising a first symbol position part for backhaul downlink symbol positions and a second symbol position part, at least one backhaul downlink symbol in the second symbol position part.

The at least one backhaul downlink symbol in the second symbol position part may comprise at least one of: a relay-physical downlink control channel data; and a relay-physical downlink shared channel data.

The at least one memory and the computer program code configured to, with the at least one processor, may cause the apparatus at least to further perform generating a candidate symbol report, wherein the report indicates at least one candidate received symbol position in the second symbol position part group of received symbols.

The at least one memory and the computer program code configured to, with the at least one processor, may cause the apparatus at least to further perform receiving a report trigger prior to generating the candidate symbol report.

The at least one memory and the computer program code configured to, with the at least one processor, may cause the apparatus at least to further perform: receiving over a first period the group of symbols; and transmitting over a second period a second group of symbols; wherein the second group of symbols are transmitted with symbols misaligned with the received symbols wherein the misalignment is equal to or greater than a switching period.

The switching period may comprise one of at least: a Tx-to-Rx switching period; and a Rx-to-Tx switching period.

The at least one memory and the computer program code configured to, with the at least one processor, may cause the apparatus at least to further perform delaying the transmitting of the second group of symbols by the switching period.

The at least one memory and the computer program code configured to, with the at least one processor, may cause the apparatus at least to further perform advancing the timing of the transmitting of the second group of symbols by the switching period.

According to a fifth aspect of the invention there may be provided a computer-readable medium encoded with instructions that, when executed by a computer, perform: determining for a group of symbols at least one candidate transmission symbol position, wherein the group of symbols comprise a first symbol position part for backhaul downlink symbol positions and a second symbol position part comprising the at least one candidate transmission symbol position; and generating at least one further backhaul downlink symbol for the at least one candidate transmission symbol position.

According to a sixth aspect of the invention there may be provided a computer-readable medium encoded with instructions that, when executed by a computer, perform receiving, for a group of symbols comprising a first symbol position part for backhaul downlink symbol positions and a second symbol position part, at least one backhaul downlink symbol in the second symbol position part.

According to a seventh aspect of the invention there may be provided an apparatus comprising: processing means for determining for a group of symbols at least one candidate transmission symbol position, wherein the group of symbols comprise a first symbol position part for backhaul downlink symbol positions and a second symbol position part comprising the at least one candidate transmission symbol position; and generating means for generating at least one further backhaul downlink symbol for the at least one candidate transmission symbol position.

According to an eighth aspect of the invention there may be provided an apparatus comprising receiving means for receiving, for a group of symbols comprising a first symbol position part for backhaul downlink symbol positions and a second symbol position part, at least one backhaul downlink symbol in the second symbol position part.

An electronic device may comprise apparatus as described above.

A chipset may comprise apparatus as described above.

According to an ninth aspect of the invention there may be provided an apparatus comprising: a transmission downlink determiner configured to determine for a group of symbols at least one candidate transmission symbol position, wherein the group of symbols comprise a first symbol position part for backhaul downlink symbol positions and a second symbol position part comprising the at least one candidate transmission symbol position; and a downlink symbol generator for generating at least one further backhaul downlink symbol for the at least one candidate transmission symbol position.

According to a tenth aspect of the invention there may be provided an apparatus comprising a downlink symbol receiver configured, for a group of symbols comprising a first symbol position part for backhaul downlink symbol positions and a second symbol position part, to receive at least one backhaul downlink symbol in the second symbol position part.

According to an eleventh aspect of the invention there is provided a method comprising: receiving over a first period a first group of symbols; transmitting over a second period a second group of symbols; wherein the second group of symbols are transmitted with symbols misaligned with the received symbols wherein the misalignment is equal to or greater than a switching period.

The switching period may comprise one of at least: a Tx-to-Rx switching period; and a Rx-to-Tx switching period.

The method may further comprise: delaying the transmitting of the second group of symbols by the switching period.

The method may further comprise: advancing the timing of the transmitting of the second group of symbols by the switching period.

According to a twelfth aspect of the invention there is provided an apparatus comprising at least one processor and at least one memory including computer program code the at least one memory and the computer program code configured to, with the at least one processor, cause the apparatus at least to perform: receiving over a first period a group of symbols; and transmitting over a second period a second group of symbols; wherein the second group of symbols are transmitted with symbols misaligned with the received symbols wherein the misalignment is equal to or greater than a switching period.

The switching period may comprise one of at least: a Tx-to-Rx switching period; and a Rx-to-Tx switching period.

The at least one memory and the computer program code configured to, with the at least one processor, may cause the apparatus at least to further perform delaying the transmitting of the second group of symbols by the switching period.

The at least one memory and the computer program code configured to, with the at least one processor, may cause the apparatus at least to further perform advancing the timing of the transmitting of the second group of symbols by the switching period.

According to a thirteenth aspect of the invention there is provided an apparatus comprising: receiving means for receiving over a first period the group of symbols; and transmitting means for transmitting over a second period a second group of symbols, wherein the second group of symbols are transmitted with symbols misaligned with the received symbols wherein the misalignment is equal to or greater than a switching period.

For a better understanding of the present invention and as to how the same may be carried into effect, reference will now be made by way of example only to the accompanying drawings in which.

The present application is described herein with reference to particular illustrative embodiments. However, such embodiments are presented for the purposes of illustrating the present application, and do not limit the scope of the invention.

Figure 1:
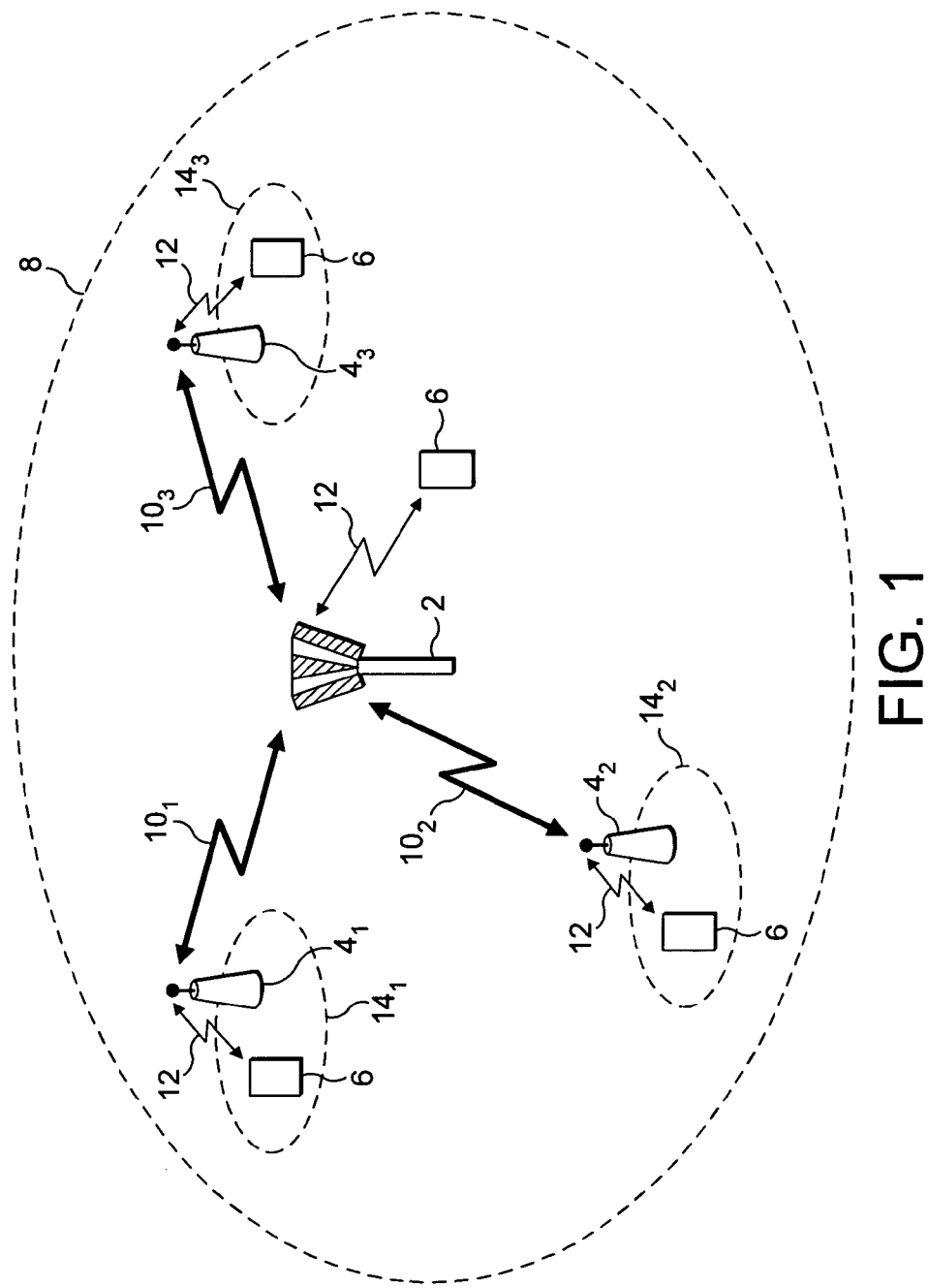
FIG. 1 shows a schematic representation of an LTE system within which embodiments of the application may be implemented.

Reference is made to FIG. 1 which shows part of a long term evolution-advanced (LTE-A) radio access network (RAN). An access node 2 is provided. The access node 2 may be a base station of a cellular system, a base station of a wireless local area network (WLAN) and/or WiMAX (Worldwide Interoperability for Microwave Access). In certain systems, the base station is referred to as a node B, an enhanced node B (eNB) or with reference to the communication with relay nodes a donor enhanced node B (DeNB). The term base station will be used in the following description and is intended to include the use of any of these access nodes or any other suitable access nodes.

The base station 2 has a cell 8 associated therewith. In the cell 8 there is shown provided three relay nodes 4. This is by way of example only and in practice there may be more or less than three relay nodes. The relay nodes 4 may be provided close to the edge of the cell to extend coverage or may be provided in a traffic hotspot, or may be provided in a location where there is an issue of shadowing (for example inside buildings). Each relay node 4 has a coverage area 14 associated therewith. The coverage area 14 may be smaller than the cell 8, of a similar cell size to the cell or larger than the cell. A relay link 10 is provided between each relay node 4 and the base station 2. The cell 8 furthermore is shown with user equipment 6. The user equipment 6 may be able to communicate directly with the base station 2 or with the base station 2 via a respective relay node 4 depending on the location of the user equipment 6. In particular if the user equipment 6 is in the coverage area associated with a relay node 4, for example inside a building, the user equipment may communicate with the relay node 4. The connections between the user equipment 6 and the relay node 4 and the direct connections between the user equipment and the base station is reference 12.

The user equipment 6 or any other suitable communication device can be used for accessing various services and/or applications provided via the communications system. In wireless or mobile communication systems, the access is provided via an access interface between mobile communication devices (UE) 6 and an appropriate wireless access system. The user equipment 6 can typically access wirelessly a communications system via at least one base station 2. The communication devices can access the communication system based on various access technologies, such as code division multiple access (CDMA), wideband CDMA (WCDMA), Orthogonal frequency division multiple access (OFDMA) or any other suitable multiple access system such as time division multiple access (TDMA) frequency division multiple access (FDMA) and space division multiple access (SDMA).

In a wireless system a network entity such as a base station 2 provides an access node for the communications devices. Each user equipment 6 may have one or more radio channels open at the same time and may receive signals from more than one base station 2 and/or communication device.

In some embodiments there may be an issue of backwards compatibility for earlier versions of the standard. For example in some embodiments from the user equipment view point, the serving network node should serve Release-8 (of the 3GPP standard) user equipment. Due to this requirement the relay nodes may support at least some and in some embodiments all of the main base station in the form of enhanced node B functionality.

In some embodiments, the system is arranged such that at most two hops are allowed in the system, for example base station to UE or base station to RN to UE. In these embodiments a tree topology is provided and no direct connections between relay nodes are permitted. However in some other embodiments of the application there may be more than two hops, for example where relays are able to communicate with each other.

A 'type 1' relay node has been proposed which is an in-band relay node having a separate physical cell identity (ID), support of hybrid automatic repeat request (HARQ) feedback and backward compatibility to release-8 (Rel8) UE.

Figure 2:
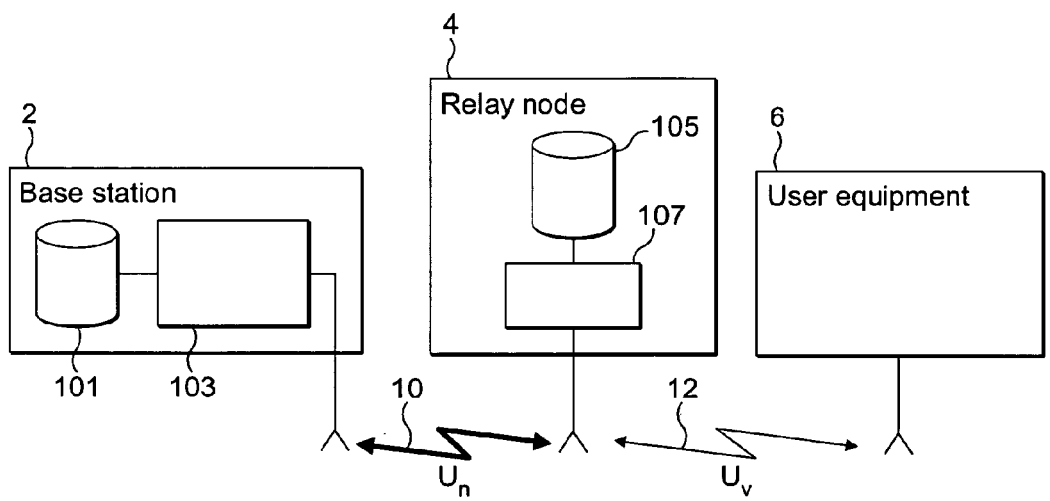
FIG. 2 shows a schematic representation of an LTE system as shown in FIG. 1 in further detail.

With regards to FIG. 2 the LTE-A RAN (Radio Access Network) is shown in further detail with the base station (DeNB) 2, relay node 4, and user equipment 6.

The schematic structure of the base station which may be a donor eNB 2 is shown in FIG. 2. The base station 2 comprises an antenna for communicating with the communication devices such as the UE 6 directly or via the relay node 4. The base station 2 also comprises at least one data processing entity 103 for carrying out various processes. Such processes may include some embodiments of the application. Additionally a memory 101 is provided which stores information which is used by the base station 2 processing entity 103. The memory 101 may for example contain instructions for operation on the processing entity for carrying out various processes which may include some embodiment of the application.

The base station 2 is shown in FIG. 2 communicating using the wireless interface 10 with the relay node 4. In some embodiments the wireless interface may be a Un interface.

The relay node 4 may comprise an antenna suitable for communicating with the base station 2 and user equipment 6. In some embodiments the relay node may comprise multiple antenna elements configured for spatial division multiplexing or in other elements a first set of antenna elements configured to communicate with the base station and a second set of antenna elements configured to communicate with the user equipment 6. The relay node may further comprise at least one processing entity 107 for carrying out various processes, which may include some embodiments of the application. The relay node may also comprise at least one memory 105 configured to store information which is used by the relay node 4 processing entity 107. The memory 105 may for example contain instructions for operation on the processing entity 107 or data for processing by the processing entity which may include some embodiments of the application.

The relay node 4 may furthermore communicate with the user equipment 6 via the wireless interface 12 which may in some embodiments be a Uu interface. The Uu interface should be consistent with the release-8 interface as defined in the long term evolution standard.

Figure 3A:
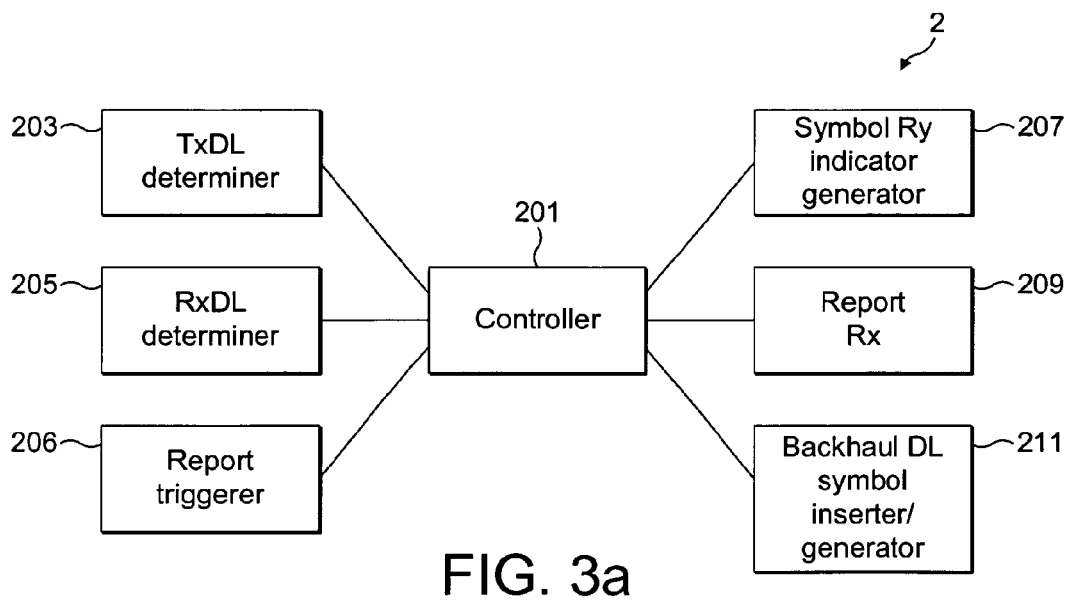
FIG. 3a shows a schematic representation of a base station as shown in FIGS. 1 and 2 according to some embodiments of the application.

With reference to FIG. 3a, a schematic structure of the base station 2 as shown in FIGS. 1 and 2 is shown in shown in further detail. The base station 2 comprises a controller 201, a transmission downlink (Tx DL) determiner 203, a receiver downlink (Rx DL) determiner 205, a report triggerer 206, a symbol receiver indicator generator 207, a report receiver 209 and a downlink backhaul symbol inserter/generator 211. In some embodiments the modules or parts represent processors or parts of a single processor configured to carry out the processes or functions of the processors described below, which are located in the same or different chip sets. Alternatively the base station processing entity 103 is configured to carry out all of the processes and FIG. 3a exemplifies the processing and controlling of the base station with respect to identifying available symbol spaces for inserting additional backhaul downlink symbols.

Figure 3B:
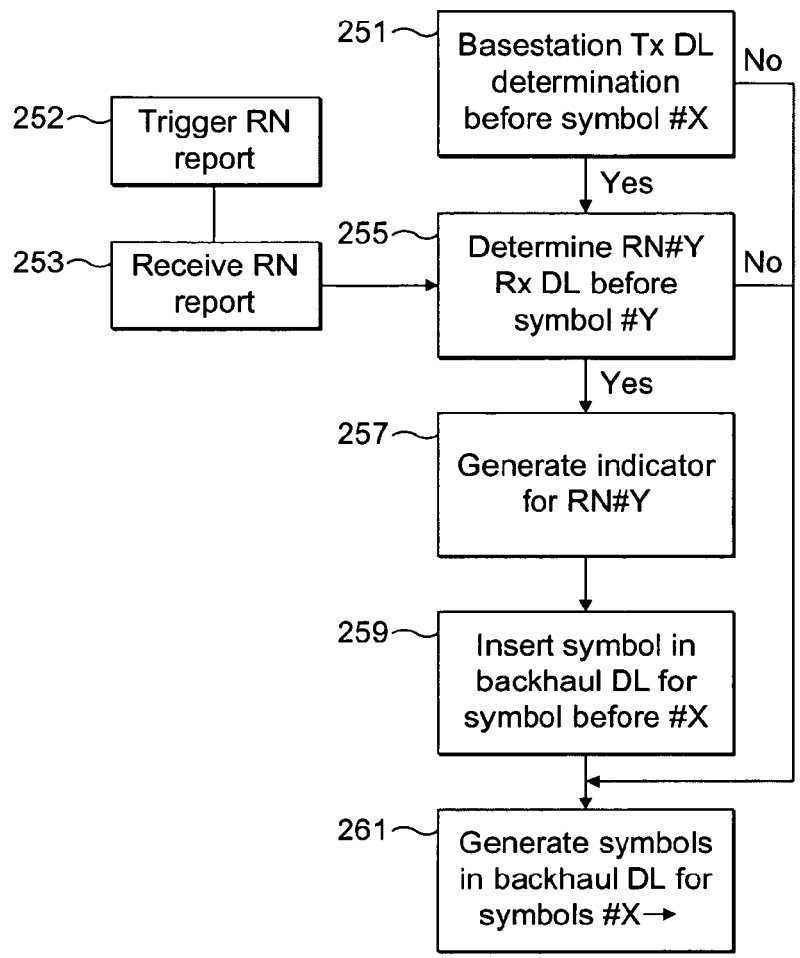
FIG. 3b shows an operation of the base station as shown in FIG. 3a according to some embodiments of the application.

With respect to FIG. 3b, the operation of the base station 2 as shown in FIG. 3a with regards to some embodiments of the application is shown in further detail. Although in the following examples the controller 201 is configured to operate the various components or operations it would be understood that the components may be implemented or configured in such a way that in some embodiments each component or operation performs a local control and passes the operation to the next operation or component or part without a central controller 201 orchestrating. Furthermore some of the parts of the base station 2 may in some embodiments be optional and not implemented. For example as described hereafter in some embodiments the report triggerer 206 is not implemented.

The controller 201 may in some embodiments be configured to operate the base station Tx DL Determiner 203 to determine whether or not the base station 2 can transmit on the downlink before a predetermined symbol in the subframe. The Tx DL Determiner 203 may therefore determine for a specified period from a single sub-frame to an interval of M subframes whether for the selected group of subframes there is at least one symbol time period between the end of the base station R8 control signalling part and the predetermined symbol start of the base station downlink backhaul signalling part. For the following examples the predetermined symbol start of the base station downlink backhaul signalling part will be referred to as #X. In the following examples the predetermined symbol start #X is #3, however it would be appreciated that for other subframe formats the predetermined symbol start may be any other suitable value.

Figure 6:
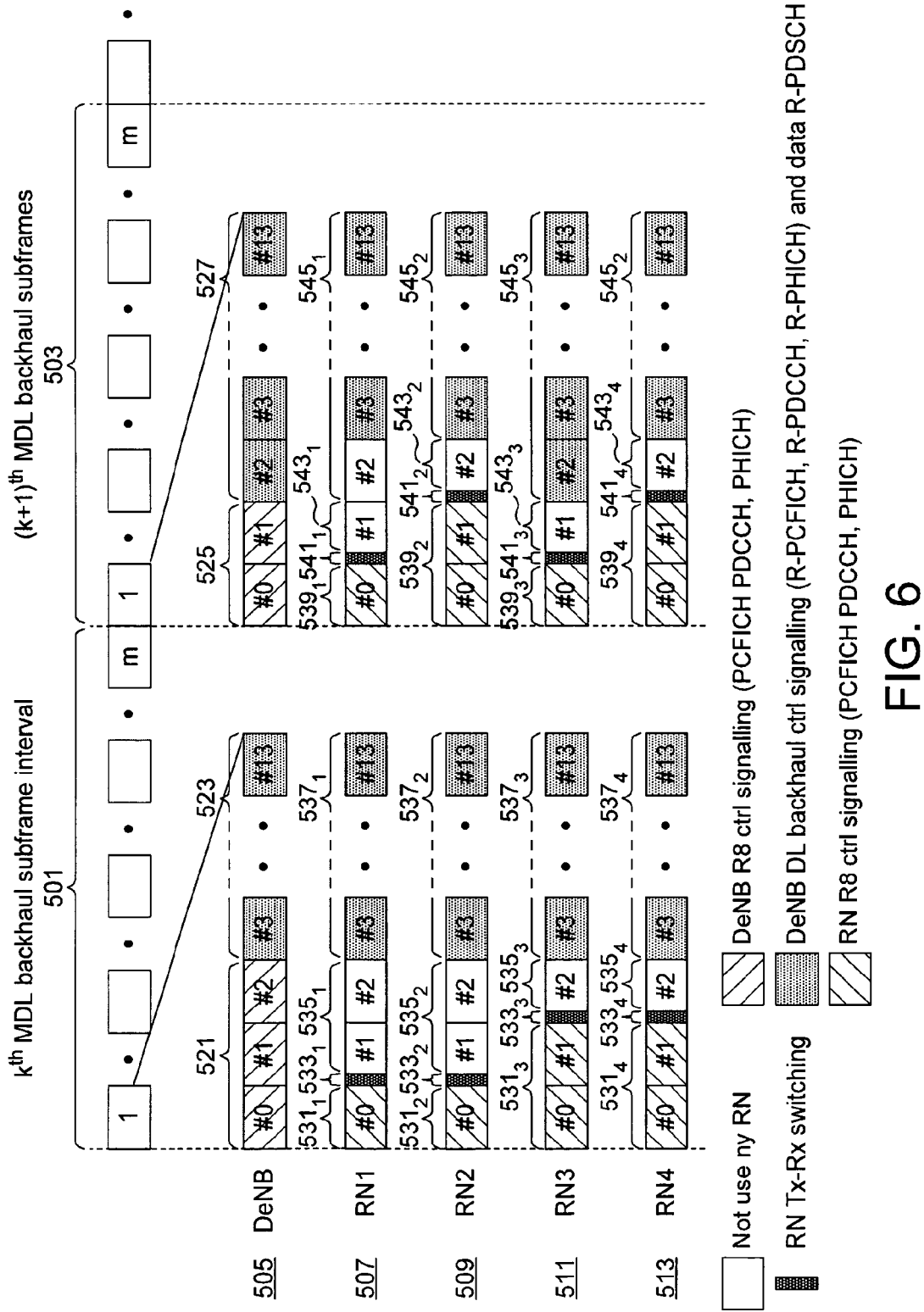
FIG. 6 shows schematic representations of base station and relay node signalling according to some embodiments of the application.

With respect to FIG. 6, an example of two specified periods is shown. These two specified periods are described as the K'th subframe interval 501, and the $(k+1)^{th}$ subframe interval 503. In these examples each subframe interval comprises M subframes where M may be any suitable number. Although in the following examples the two intervals have the same number of subframes, it would be understood that in some embodiments intervals may have differing numbers of subframes. Furthermore although in the following examples each subframe comprises 14 symbol periods marked periods #0 to #13 the subframe length may be any suitable symbol length.

Figure 5:
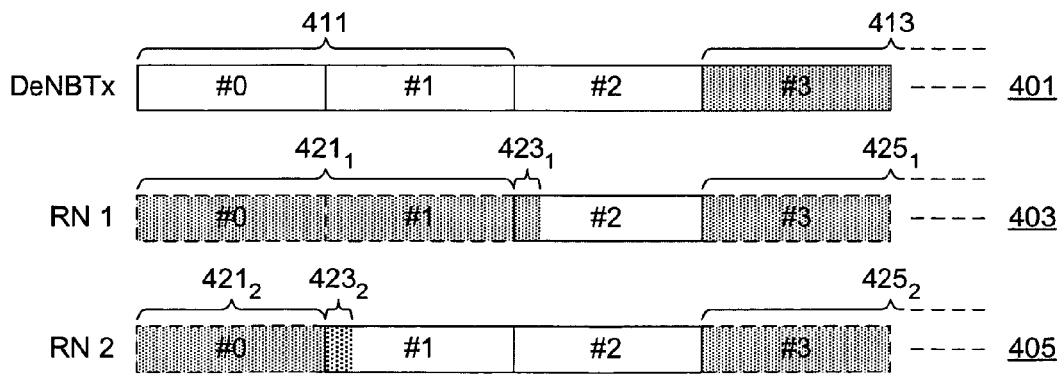
FIG. 5 shows a schematic representation of base station and relay node signalling.

FIG. 6 shows base station (DeNB) subframe symbol configuration for a first subframe of each of the two intervals. As has been discussed previously with regards to FIG. 5, the base station symbol configuration for a subframe comprises a first part 521, 525 whereby the base station transmits R8 control signalling to the user equipment being serviced by the base station 2. The number of symbols required to transmit the R8 control signalling may vary from interval to interval.

In the first interval 501 the subframe first part 521 requires the use of the first three symbols #0, #1 and #2. Therefore the first symbol period for which the base station may use for transmission of DL backhaul information (in other words the DL backhaul control and data part) is symbol #3. Thus the Tx DL determiner 203 may therefore determine that for the first interval 501 that there is no possibility of transmitting additional DL backhaul information before the predetermined symbol #3. This conclusion may be passed to the controller 201 which configures the DL backhaul symbol generator to generate symbols for the DL backhaul for symbols #3 to the end of the subframe for the first interval length.

In the second interval 503 the subframe first part 525 requires the use of the first two symbols only #0 and #1. Therefore the first symbol period for which the base station may use for transmission of DL backhaul information (in other words the DL backhaul control and data part) is before symbol #3. Thus the Tx DL determiner 203 may therefore determine that for the second interval 503 that there is a possibility of transmitting additional DL backhaul information before the predetermined symbol #3. This conclusion may be passed to the controller 201 which configures the RX DL determiner 205 to determine if any of the serviced relay nodes has a possibility of receiving any additional DL backhaul information.

Thus in some embodiments there is in summary a method comprising: determining for a group of symbols at least one candidate transmission symbol position, wherein the group of symbols comprise a first symbol position part for backhaul downlink symbol positions and a second symbol position part comprising the at least one candidate transmission symbol position; and generating at least one further backhaul downlink symbol for the at least one candidate transmission symbol position.

The base station transmission determination operation is shown in FIG. 3*b* by step 251.

The Rx DL determiner 205 furthermore when initiated by the controller 201 determines whether or not any of the relay nodes currently being served by the base station can receive downlink backhaul information before symbol #X.

In some embodiments of the application this determination may be carried out following receiving a report from at least one relay node (RN) being served by the base station 2.

In some embodiments, the base station comprises a report receiver 209. In such embodiments the controller 201 operates the report receiver 209 to receive the reports from at least one relay node being served by the base station. In some embodiments the controller 201 operates the report receiver 209 to only receive reports from relay nodes 4 when the Tx DL determiner has indicated that the number of R8 control symbols is less than the number of symbols before the predetermined backhaul DL is due to start. However in other embodiments of the application the controller 201 operates the report receiver 209 to receive reports even if for the current interval the Tx DL determiner 203 has indicated there is no possibility of inserting backhaul DL symbols.

With respect to FIG. 6 and as described previously each relay node (RN) divides the subframe into a first part 531, 539 where the relay node transmits R8 control information to UE being serviced by the relay node. In the following examples, each relay node (RN) may transmit either one or two symbols as the relay node release-8 control signalling part of the subframe. Each relay node subframe further comprises a guard period 533, 541 and at least part of a symbol not used 535, 543 where the relay node is configured to switch from transmitting to receiving. Each relay node subframe further comprises a backhaul downlink part 537, 545 for receiving the backhaul downlink information transmitted from the base station.

For example as shown in FIG. 6, the first relay node (RN1) 507 has the first interval subframe relay node R8 control signalling part 531$_1$ and the second interval subframe relay node R8 control signalling part 539$_1$ use only one symbol #0. The second relay node (RN2) 509 has a first interval subframe relay node R8 control signalling part 531$_2$ using only one symbol #0 and the second interval subframe relay node R8 control signalling part 539$_2$ using two symbols #0 and #1. The third relay node (RN3) 511 has a first interval subframe relay node R8 control signalling part 531$_3$ using two symbols #0 and #1, and the second interval subframe relay node R8 control signalling part 539$_3$ using only one symbol #0. The fourth relay node (RN4) 513 has a first interval subframe relay node R8 control signalling part 531$_4$ using two symbols #0 and #1, and the second interval subframe relay node R8 control signalling part 539$_4$ using two symbols #0 and #1.

The relay node report received may in some embodiments be a single bit value which indicates whether the control signalling part, for example the PDCCH part is one or two symbols. For example the base station report receiver 209 may receive a bit value of 0 from a relay node indicating that the relay node transmits only one PDCCH symbol for the subframe interval, whereas if the base station report receiver 209 receives a bit value of 1 then the relay node uses two PDCCH symbols to transmit the control signalling part.

The operation of receiving the RN report is shown in FIG. 3*b* as the step 253.

Furthermore in some embodiments the base station comprises a report triggerer 206 configured to trigger the relay node to generate the report described above.

In some embodiments the report triggerer 206 is configured to, dependent on being operated by the controller 201, to trigger a report when the Tx DL determiner has indicated that the number of R8 control symbols is less than the number of symbols before the predetermined backhaul DL is due to start. In other embodiments the report triggerer 206 is configured to trigger a report to be generated on a periodic basis, for example to trigger a report for every M subframe interval.

The report triggerer 206 may in some embodiments trigger the relay node to generate a report by generating relay node specific control information to instruct specifically addressed relay nodes when and/or which resources to report. In other embodiments the report triggerer 206 may generate relay node common control information indicating to all relay nodes served by the base station to generate a report.

In some embodiments, for example where the report triggerer 206 is configured to trigger a report following the Tx DL determiner has indicated that the number of R8 control symbols is less than the number of symbols before the predetermined backhaul DL is due to start, less downlink control overheads are required. In these embodiments the relay node common control information may be mapped to certain predetermined backhaul resources available to all relay nodes. For example the report triggerer 206 may in these embodiments determine two sequences of length N as S1=[S1_1, S1_2, . . . , S1_N], and
S2=[S2_1, S2_2, . . . , S2_N].

Then the report triggerer 206 may output sequence S1 in predefined resources when the Tx DL determiner has determined that the base station PDCCH symbol number is less than 3 else the report triggerer 206 outputs sequence S2. In some embodiments one of these two sequences may be empty and the report triggerer 206 outputs nothing and the RN detect the absence of the other sequence instead.

The report triggerer 206 may operate with a periodicity which may be updated, for example by RRC signalling common to all relay nodes.

The generation of a report trigger is shown in FIG. 3*b* by step 252.

It will be appreciated that in some embodiments of the application the relay node report triggerer 206 is optional and the relay node may generate reports independently of any triggering by the base station as will be described later.

In some further embodiments of the application, the Rx DL Determiner may decide how many symbols the PDCCH should use in at least one relay node and then determine if at least one RN has space to insert a symbol before the predetermined symbol #X (in other words to determine if there is a spare symbol to place a R-PDSCH symbol) autonomously.

In some other embodiments the Rx DL determiner 205 may receive indications from the report receiver 209 which may be overridden in some circumstances. This may be relevant in cases where most of the control is located in the base station and the RNs only provide some supportive indication to it. In such embodiments the base station can either follow the indication given by the supportive information or override it and set another setting. For example in such embodiments if most of the RNs select to use 2 symbols for PDCCH then the base station may decide it is not justified to use only 1 symbol at a few RNs but instruct them to use 2 symbols as well for simplicity. In some embodiments where the Rx DL determiner 205 makes the determination independent of reporting not only is there the signalling advantage but also the decisions may allow the PDCCH size to be equal for all relay nodes, ease scheduling and thus select a more efficient backhaul usage even if the selection may not be optimal for some individual relay nodes. Furthermore a common value may in some embodiments be sent on a common control channel.

It would be understood that dependent on the determination of the Rx DL values and the selection of the size of the PDCCH to be used by the relay nodes must be communicated to the relay nodes in advance before the backhaul DL frame because the relay node must know this value sufficiently before to prepare and send the PDCCH information in the first symbols of the subframe.

For the example as shown in FIG. 6 where each of the four RN have reported the control signalling for the second interval to the report receiver the Rx DL determiner 205 may in some embodiments determine that the first RN 507 and third RN 511 may be suitable for receiving a backhaul symbol before the #3 symbol. The Rx DL determiner 205 may in some embodiments determine the second RN 509 and fourth RN 513 are not suitable for receiving a backhaul DL symbol before the #3 symbol. In some embodiments thus a positive indication may be output to the controller with respect to the first and third RN and a negative indication may be output to the controller with respect to the second and fourth RN.

The determination of whether or not the relay node #Y may receive a downlink before the symbol #X is shown in FIG. 3b by step 255.

The relay nodes for which the controller 201 receive a negative indication may then be processed according to step 261 where the backhaul DL symbol inserter/generator 211 generates and output symbols from the #X symbol.

The controller 201 then may in some embodiments operate the symbol Rx indicator generator 207 to generate an indicator to be output to the RN for the RN where symbols may be inserted.

The symbol Rx indicator generator 207 may in some embodiments generate an indication by the use of downlink grant information for the relay physical downlink control channel (R-PDCCH). In these embodiments, the indicator may then be detected by the relay node along with other relevant information such as modulation and coding scheme information, and redundancy version of the relay physical downlink shared channel (R-PDSCH). In such embodiments the symbol Rx indicator generator 207 may convey the information by the use of one additional bit value which would indicate whether for a certain RN the DL backhaul starts from symbol #2 or #3. In further embodiments the symbol Rx indicator generator 207 may convey the information by applying a predetermined scrambling sequence to the cyclic redundancy check value for the R-PDCCH.

In some other embodiments the symbol indicator Rx generator 207 may indicate this information to multiple relay nodes by using the downlink relay node common control channel. In other words by using the R-PDCCH with a common relay node radio network temporary identifier (RNTI) or alternatively using the relay physical control channel formal indicator channel (R-PCFICH) implicitly. For example if the R-PCFICH indicates DeNB only uses Orthogonal Symbol OS-0 (#0) and OS-1 (#1) for R8 control signalling transmission then the OS-2 (#2) may be used for the backhaul.

In further embodiments of the application the symbol Rx indicator generator 207 may provide an indication of the base station PDCCH symbol usage for the interval. In such embodiments the indicator may be received by the RN which may then check this against the RN R-PDCCH symbol usage. Thus where the base station PDCCH symbol usage is less than 3 and the RN determines its own R-PDCCH symbol usage is only one the RN can configure itself to prepare to receive an additional symbol value at the symbol #2 position for the subframe.

In some embodiments the symbol Rx indicator generator 207 is optional and implicit symbol insertion indication may be implemented. The operation of implicit symbol insertion detection is described later with respect to FIG. 4a, and FIG. 8.

The generation of the indicator for RN #Y is shown in FIG. 3b by step 257.

The backhaul downlink symbol inserter 211 may, dependent on the controller 201 in some embodiments, insert symbols into the backhaul downlink for symbols before #X. The inserted symbol information may in some embodiments be relay node specific control information (R-PDCCH) or in other embodiments may be relay physical downlink shared channel information (R-PDSCH).

Figure 7:
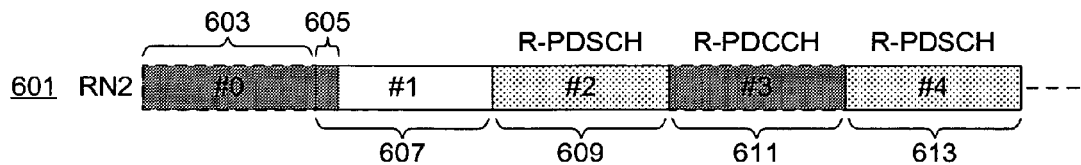
FIG. 7 shows schematically the multiplexing of control information and data information on the relay node downlink backhaul according to some embodiments of the application.

In the embodiments where the backhaul DL symbol inserter/generator 211 inserts relay nodes specific control information, this control information is required only for the addressed relay node. Where the backhaul DL symbol inserter/generator 211 may insert a physical downlink shared channel symbol, the base station operates modulation encoding and rate matching throughout all of the R-PDSCH channels in the subframe. For example as shown in FIG. 7 an inserted R-PDSCH symbol, symbol #2 609, is inserted prior to the R-PDCCH symbol, symbol #3 611, and the second R-PDSCH symbol, symbol #4 613 but following the R8 control symbol, symbol #0 603, and the guard space 605 which occupies partially symbol #1 607.

The operation of inserting the symbol into the backhaul downlink is shown in FIG. 3b by step 259.

The backhaul DL symbol inserter/generator may then in some embodiments generate and output the symbols for the subframe for remainder of the subframe. This operation is shown in FIG. 3b by step 261.

Figure 4A:
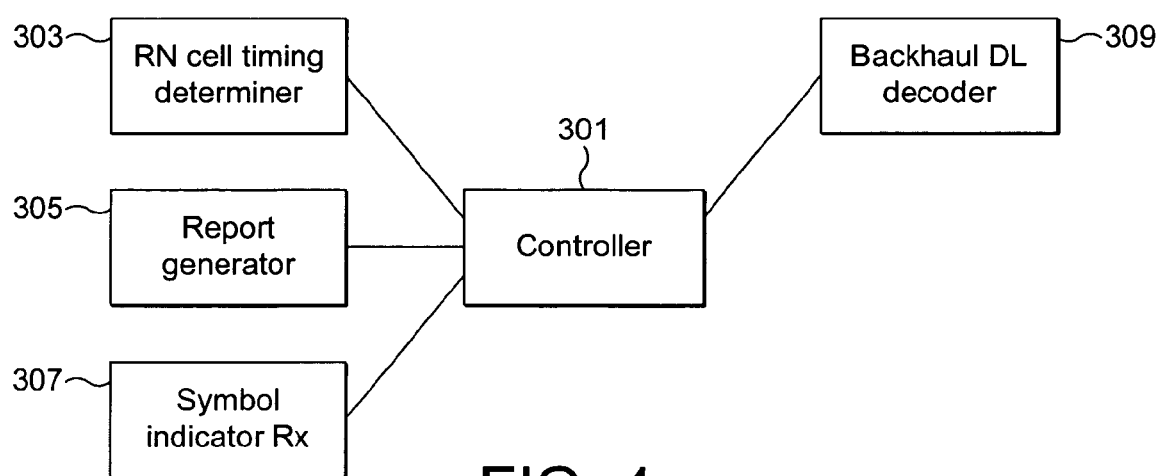
FIG. 4a shows a schematic representation of a relay node as shown in FIGS. 1 and 2 according to some embodiments of the application.

With reference to FIG. 4a, a schematic structure of the relay node 4 as shown in FIGS. 1 and 2 is shown in further detail. The relay node comprises in some embodiments a controller 301, a relay node cell timing determiner 303, a report generator 305, a symbol indicator Rx 307 and a backhaul DL decoder 309. In some embodiments the modules or parts represent processors or parts of a single processor configured to carry out the processes or functions of the processors described below, which are located in the same or different chip sets. Alternatively the relay node processing entity 107 is configured to carry out all of the processes and FIG. 4a exemplifies the processing and controlling of the relay node with respect to identifying available symbol spaces for inserting additional backhaul downlink symbols.

Figure 4B:
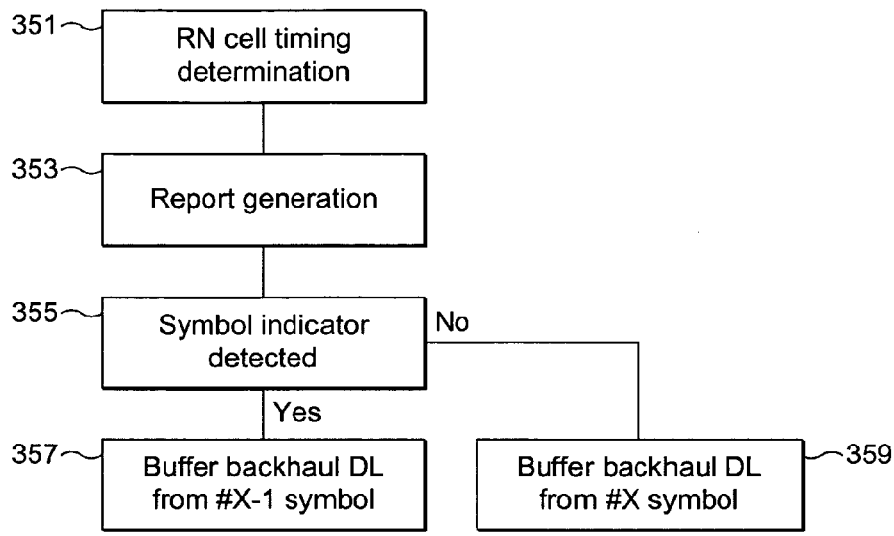
FIG. 4b shows the operation of the relay node as shown in FIG. 4a according to some embodiments of the application.

With respect to FIG. 4b, the operation of the relay node 4 as shown in FIG. 4a with regards to some embodiments of the application is shown in further detail. Although in the following examples the controller is configured to operate the various components or operations it would be understood that the components may be implemented or configured in such a way that in some embodiments each component or operation performs a local control and passes the operation to the next operation or component or part without a central controller 301 orchestrating.

The relay node cell timing determiner 303 is configured to set up the cell downlink timing set up. In the embodiments described above a specific timing relation has been assumed where the relay node is perfectly synchronized with the base station. In some embodiments the relay node cell timing determiner 303 may implement a RN cell synchronization process to synchronize the RN cell symbol transmission timing to the base station cell symbol timing. For example in some embodiments the relay node may be equipped with a global positioning receiver (such as a GPS receiver) and determine accurately the propagation delay between the base station and relay node and thus apply a timing adjustment to the symbols to be transmitted by the relay node. However as the implementation of positioning receiver based synchronisation can lead to relay nodes being more expensive to implement both in terms of initial cost (requiring additional circuitry to be designed) and operating costs (in operating the additional circuitry). Furthermore positioning reception may not be possible to implement for all the relay nodes. In some embodiments the relay node is operable within buildings not able to receive the timing signals.

Figure 10:
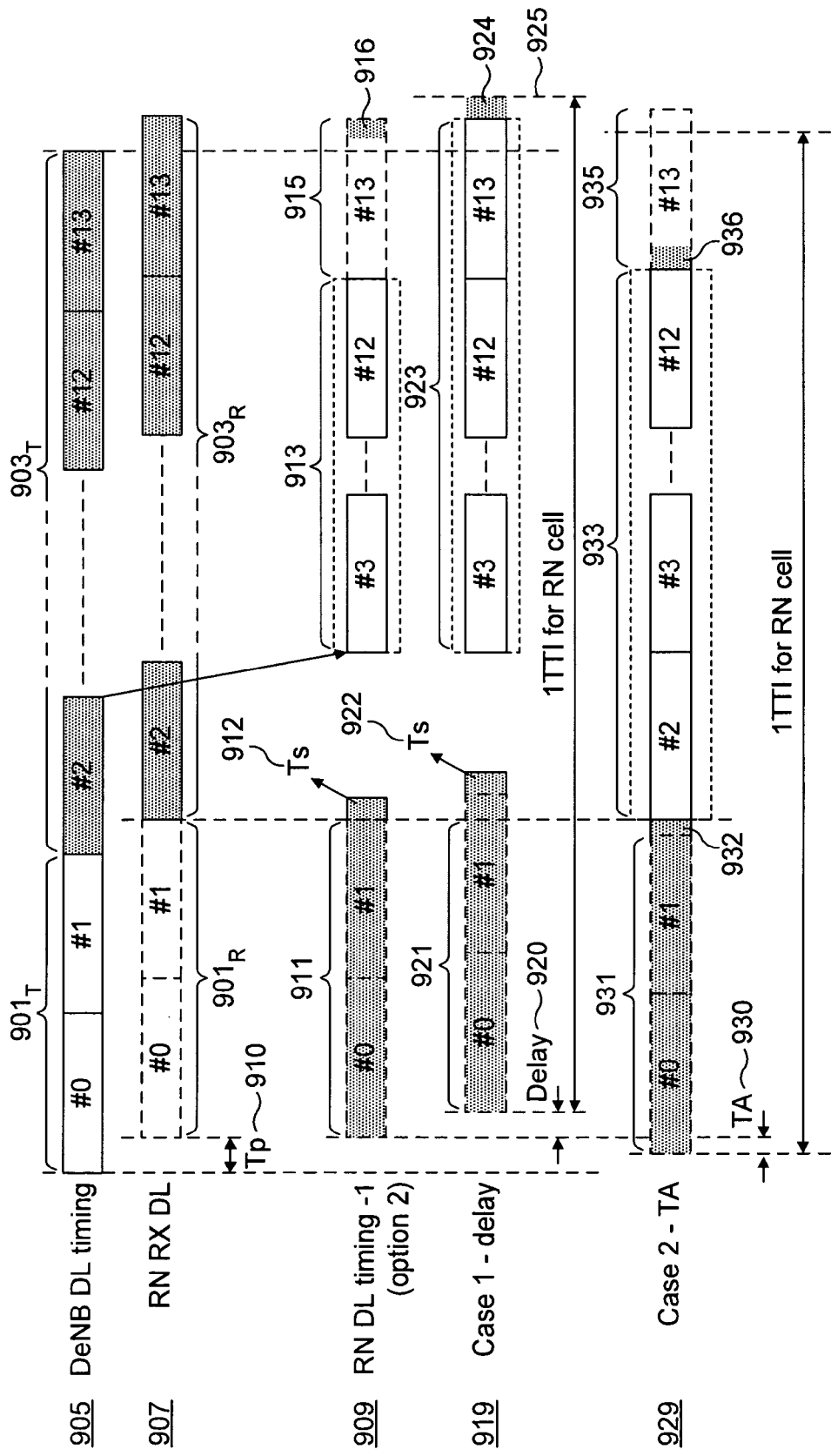
FIG. 10 shows schematically further signalling of the base station and the relay nodes according to some further embodiments of the application.

In some embodiments therefore the relay node cell timing determiner 303 may implement timing advance or delay for the symbols to be transmitted To help to understand the application of the relay node cell timing determiner 303 some example transmissions are shown with respect to FIG. 10. Similar to the transmissions shown in FIGS. 5 and 6 the first line 905 shows the symbol timings at the basestation. The symbols as discussed previously comprise a first part of R8 control symbols $901_T$, the two symbols #0 and #1 of the subframe, and a second part of potential backhaul DL symbols $903_T$, the symbols #2 to #13.

The propagation delay, indicated by the timing period Tp 910 in the figure, the timing of the symbols received at the RN is somewhat delayed, the received symbols 907, comprising the first part of R8 control symbols $901_R$, and the second part of potential backhaul DL symbols $903_R$ typically is also reflected in the relay node cell symbol timing. Thus in some embodiments the received synchronised relay node symbols 909 in a subframe comprise the RN R8 control symbol part 911 (shown as symbols #0 and #1), the Tx-to-Rx guard period $T_s$ 912 (shown occupying at least part of symbol #2), the potential backhaul DL symbols 913 (shown as symbols #3 to #12), and a Rx-to-Tx guard period 916 (shown occupying at least part of symbol #13 915). In such embodiments the guard periods, the Tx-to-Rx guard period 912 and Rx-to-Rx guard period 916 prevent the transmission of two symbols, the #2 and #13 symbols.

However in embodiments of the application the relay node cell timing determiner 303 may by applying either a suitable delay or a suitable timing advance to the R8 control symbols being transmitted, in this example #0 and #1, improve the efficiency by deliberately misaligning the symbol timings between the RN and base station as is shown in FIG. 10 in example 1—delay 919 and example 2—timing advance 929, where the misalignment is selected to delay or advance the RN timing by at least the guard or switching time.

Thus in some embodiments the relay node cell timing determiner 303 may misalign the RN transmitted symbols by applying a delay 920 compared to the timing of the symbols as they are received at the RN. In some embodiments the delay 920 is at least the switching time of the Rx-to-Tx guard period 916. In such embodiments this allows the RN to receive for the period 923 from the symbol #3 to the last symbol #13 in the subframe, and still allow time (shown by period 924) to switch to TX in time to transmit symbol #0 for the next TTI. The #0 symbol for the next TTI is not shown in FIG. 10 but its timing is indicated by the dashed line 925.

In some other embodiments the relay node cell timing determiner 303 may misalign the RN transmitted symbols by applying a timing advance compared to the timing of the symbols as they are received at the RN. In some embodiments the timing advance TA 930 is at least the switching time of the Tx-to-Rx guard period Ts 912. In such embodiments this allows the RN to receive for the period 933 from the symbol #2 to symbol #12, with the Rx-to-Tx guard period occupying at least part of the time period for symbol #13. In other words the misalignment moves the Tx-to-Rx guard period 932 into the received symbol #1 period and just before switching to TX.

In both examples, an extra symbol may therefore be received compared to the received symbol aligned example shown in symbol line 909. However in practice there may be a difference between these two examples. As has been explained previously, the base station may transmit PDCCH data for symbol #2. In some of the examples the base station always transmits data (as shown in the first interval shown in FIG. 6) or only in some TTIs. Thus in these embodiments then there may be no advantage if the RN is able to receive symbol #2 as backhaul DL information. Furthermore as PDCCH data is never sent as symbol #13, in some embodiments the relay node cell timing determiner 303 delays the RN timing accordingly, by at least by the switching time to preserve the last symbol as being suitable for backhaul DL data at the expense of being able to receive data at the symbol #2. In some embodiments the relay node cell timing determiner 303 may delay the timing by even further than the Rx-to-Tx switching period or guard period to provide more switching time before the RN does transmit data. This extra switching time is advantageous as it provides time to be available to do some processing on the data that is received in the backhaul subframe before being forwarded towards the UE in the following or later subframes. As in these examples symbol #2 is not typically available for reception unless the base station R8 transmission is less than 2 symbols.

Although the transmission symbol misalignment embodiments described above may be, as described here, applicable to the other embodiments described above, they are also applicable independently from each other. In other words timing misalignment may be implemented in some embodiments separately from the symbol detection embodiments.

Thus in summary there may be according to embodiments of the application a method comprising: receiving over a first period a first group of symbols; transmitting over a second period a second group of symbols; wherein the second group of symbols are transmitted with symbols misaligned with the received symbols wherein the misalignment is equal to or greater than a switching period.

The operation of symbol transmission misalignment determination is shown in FIG. 4b by step 351.

The relay mode report generator 305 may in some embodiments generate reports according to the embodiments described above. Thus in some embodiments the report generator 305 may be triggered by the receipt of a report trigger from the base station to determine how many R8 control symbols may be used in the sub-frame.

In some embodiments, the relay node report generator determines for itself whether or not to report the number of R8 control symbols used to the base station. This relay node report generator 305 decision may be based in some embodiments upon the number of user equipment serviced by the RN and the services supplied to the user equipment. Thus for example where the PDCCH overhead for the relay node cell is very low so that only one PDCCH symbol is enough, the report generator 305 may report this to the base station. Furthermore the report generator 305 decision whether or not to report the information may in some embodiments depend on the distance of the user equipment from the relay node (or more specifically the received signal quality). For example where the quality is good a high coding rate can be selected for the PDCCH while in poor conditions a more robust coding with lower coding rate needs to be selected, in these embodiments transmitting the same amount of information requires several control channel elements (CCEs) have to be combined to form a R-PDCCH transmission and consequently more capacity is needed. In short, more symbols are required for PDCCH. It may be noted that the report generator 305 report information may improve the decision making as although the number of user equipment served by the relay node may be known to the base station typically the signal quality for the user equipment served by the relay node is not reported to the base station.

The relay node reports may be output by the report generator in some embodiments by media access control (MAC) signalling. In other embodiments RRC signalling may be used. In some further embodiments any suitable higher layer protocol may be used to signal the report. For example in some embodiments where the number of relay node symbols used for the PDCCH signalling is fixed during a number of consecutive subframes such as the interval number M then the signalling bit value, B, may be conveyed by MAC signalling if the number M is small or by RRC signalling M is greater than a certain threshold.

The signalling resources used for relay node reporting may in some embodiments be predetermined and known by both the base station and relay nodes. For example in some embodiments when the relay node has uplink data to transmit in one uplink backhaul subframe, the relay node may in some embodiments piggyback or multiplex the reporting signalling with the uplink data in the relay physical uplink shared channel. The base station in such embodiments may be able to decode the uplink data and extract from the signalling the relay node report information. If there is no uplink data output from a specific relay node in the uplink backhaul subframe, the base station may schedule dedicated resources for relay node reporting if required. The relay node reporting may thus be similar to any suitable uplink signalling where the relay node first requests an uplink resource which is granted by the base station.

The generation of reports is shown in FIG. 4b by step 353.

The relay node symbol indicator 307 furthermore in some embodiments determines from the received indicator that the backhaul DL decoder 309 may receive an additional symbol.

Figure 8:
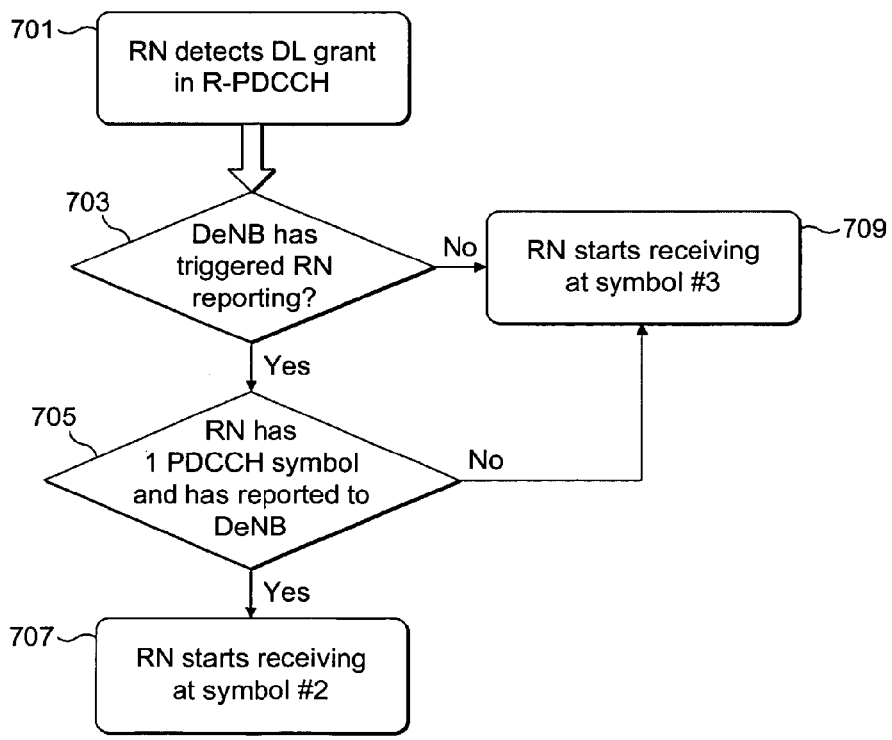
FIG. 8 shows the operation of a relay node and base station according to some further embodiments of the application.

As described above in some embodiments the insertion of an indicator may be explicit, however with respect to FIG. 8 an implicit indication detection operation is shown.

In such embodiments, the relay node controller 301 may detect a downlink grant in the R-PDCCH. The detection of the downlink grant is shown in FIG. 8 by step 701.

Furthermore the relay node controller 301 detects whether the base station has explicitly triggered a relay node reporting operation. As described above in some embodiments the explicit triggering of a reporting operation is only implemented when the base station determines that the base station is capable of transmitting the extra symbol before the predetermined symbol value.

The detection of an explicit RN report trigger is shown in FIG. 8 by step 703.

When no explicit RN report trigger is detected the relay node controller may in some embodiments configure the Backhaul DL decoder 309 to start receiving backhaul DL symbols at the predetermined value #X. This configuration of the decoder to start receiving symbols at #X for example #3 is shown in step 709.

When an explicit RN report is detected the relay node controller 301 may then in some embodiments determine if the report generator 305 output a report where only 1 PDCCH symbol was determined for the subframe.

When either 2 PDCCH symbols are determined or the report generator 305 did not report the determination of only 1 PDCCH symbol the controller may in some embodiments configure the Backhaul DL decoder 309 to start receiving backhaul DL symbols at the predetermined value #X. This configuration of the decoder to start receiving symbols at #X for example #3 is shown in step 709.

When the report generator 305 output a report where only 1 PDCCH symbol was determined for the subframe the controller may in some embodiments configure the Backhaul DL decoder 309 to start receiving backhaul DL symbols before the predetermined value #X. This configuration of the decoder to start receiving symbols at #2 is shown in step 707.

The implicit method described above requires no additional base station information. In further embodiments the mapping of data on that first symbol i.e. symbol #2 as shown in step 707, is done in a specific way: First data are mapped to those symbols that are always available (i.e. the other symbols following symbol #2), no matter which decision was done in the base station and RN. Then remaining data may be mapped to symbol #2, typically these remaining data will be additional redundant bits that are generated by the encoding. These additional redundant bits enhance the performance if they are recognized by the RN, but they are not strictly speaking essential so the RN can also operate if it is not aware of them, albeit at somewhat poorer performance, e.g. somewhat higher error rate. Therefore this embodiment may further improve the implicit method's ability to suffer errors. In any error case, the relay node may not receive this extra data on symbol #2 despite when they were transmitted by the base station or it will erroneously interpreted non sent data as data. However the other data is always received correctly. This is due to the specific rate matching that is done in long term evolution. In further embodiments the data may be mapped in reverse order, in other words start with the first bit in the last symbol then fill the proceeding bits one by one up to the first symbol, then if there is an additional space before the R-PDSCH, the last bits are allocated there.

The detection of the indicator for the inserted symbol is shown in FIG. 4b by step 355.

The relay node in some embodiments will decode the R-PDCCH based on a semi-static downlink backhaul control starting point thus in some embodiments where no indicator has been detected either explicitly or implicitly the buffer of backhaul DL symbols is from the #X symbol (for example symbol #3). However in some embodiments the backhaul DL decoder on determination of the indicator may buffer and decode symbols before the predetermined symbol #X. The operation of buffering at the #X symbol is shown in FIG. 4b at step 357 and at the #X-1 symbol in FIG. 4b at step 359.

After determining the number R-PDSCH symbols, the relay node can begin the decoding process by taking into account several parameters such as symbol number, modulation coding schemes and parameters for rate matching. In addition the R-PDCCH, the base station transmitted symbols for the downlink control signalling on the backhaul link could also be used for R-PCFICH and R-PHICH if specified in LTE.

Therefore in some embodiments of the application may be summarised by a method comprising receiving, for a group of symbols comprising a first symbol position part for backhaul downlink symbol positions and a second symbol position part, at least one backhaul downlink symbol in the second symbol position part.

Figure 9:
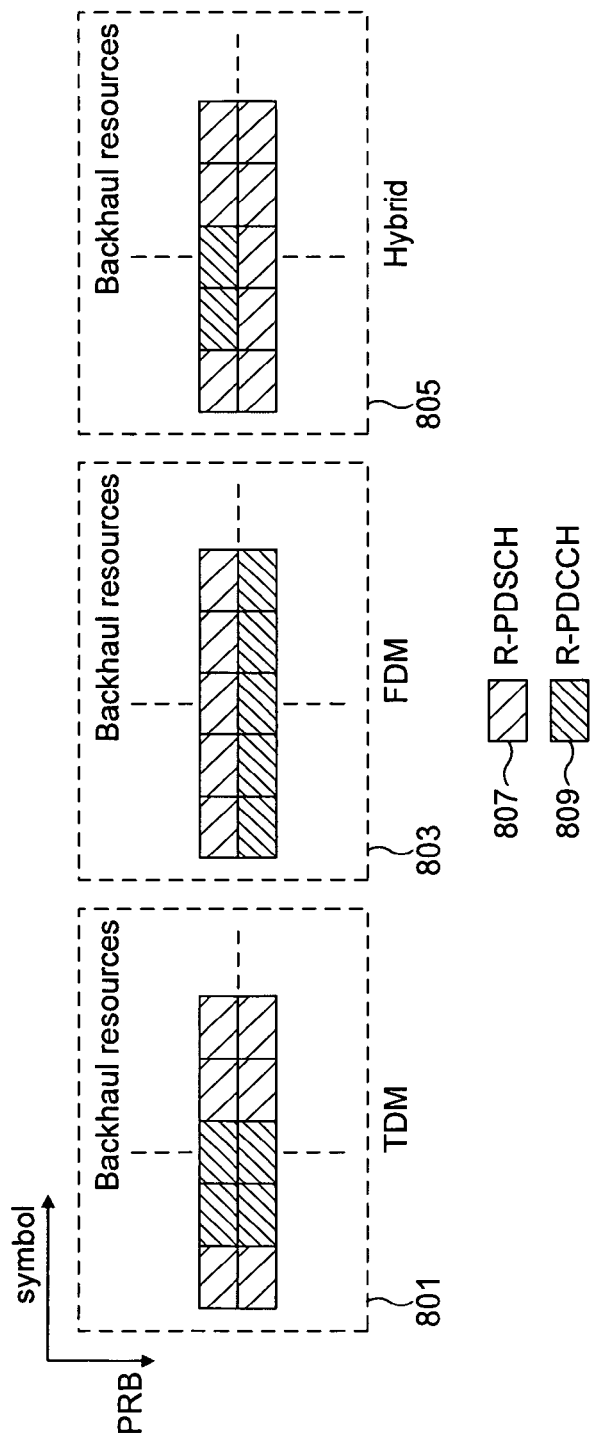
FIG. 9 shows schematically the allocation of backhaul resources and multiplexing operation according to some embodiments of the application.

As shown in FIG. 9 there are several possible options for R-PDCCH and R-PDSCH multiplexing, for example frequency division multiplexing, as shown in 803, time division multiplexing as shown in 801, and hybrid FDM/TDM which is shown in 805 of FIG. 9. All of the methods are valid for the different multiplexing methods. For example in TDM, the R-PDCCH and R-PDSCH are multiplexed within symbols #3 to #13. Furthermore symbol #2 may be used for backhaul transmissions for the R-PDSCH which means the addition of available resources will be all the physical resource blocks within that symbol. However in some embodiments not necessarily all symbols in the physical resource block may be used and it may be noted that in the frequency division multiplexing case potentially only the symbols in the PRBs that are used for R-PDSCH are used but not symbol #2 of the PRB where R-PDCCH is scheduled. Some embodiments may be possible to use even that symbol however this then would make the FDM case to look like a hybrid DM system.

The previous embodiments have been described using the assumption that the RN and base station use at least one symbol for PDCCH (in either the MBSFN or normal subframe) to be compatible with Release-8. However in some embodiments the methods and apparatus described above may also be applied accordingly if no symbol is used for PDCCH, at the expense of losing backward compatibility to LTE Release-8 communications. In other words in some embodiments where no release-8 UEs may be connected with the RN or base station (at least on the considered carrier) it may be possible to use symbols prior to symbol #3 for backhaul DL information. In some further embodiments a simpler implementation may be to always start the R-PDCCH at the same symbol. The additionally available prior symbols may then be used for R-PDSCH as indicated already above also in this case.

Thus embodiments of the application may be applicable for any scenario where there are different configurations used at RNs or base stations with the consequence that different symbols can be used for backhaul accordingly.

It is noted that the embodiments of the application and functionality may be provided according to some embodiments by a separate component to the data processing entity. In some embodiments the functionality of the methods according to some embodiments are carried out by other parts of a system separate from the base station. For example in an embodiment the functionality may be carried out by network controllers.

The present application is described herein with reference to examples of preferred embodiments for the purpose of illustration, and is not limited to any such embodiments. The scope of the present invention is defined by the appended claims.

It shall be appreciated that the term user equipment is intended to cover any suitable type of wireless user equipment, such as mobile telephones, portable data processing devices or portable web browsers.

Furthermore elements of a public land mobile network (PLMN) may also comprise apparatus as described above.

In general, the various embodiments described above may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of the application may be implemented by computer software executable by a data processor, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example digital versatile disc (DVD), compact discs (CD) and the data variants thereof both.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

For example the present invention may be applied to base stations other than eNode-Bs.

However, all such and similar modifications of the teachings of this invention will still fall within the scope of this invention as defined in the appended claims.

As used in this application, the term circuitry may refer to all of the following: (a) hardware-only circuit implementations (such as implementations in only analogue and/or digital circuitry) and (b) to combinations of circuits and software (and/or firmware), such as and where applicable: (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of circuitry applies to all uses of this term in this application, including in any claims. As a further example, as used in this application, the term circuitry would also cover an implementation of merely a processor (or multiple processors) or portion of a processor and its (or their) accompanying software and/or firmware. The term circuitry would also cover, for example and if applicable to the particular claim element, a baseband integrated circuit or applications processor integrated circuit for a mobile phone or a similar integrated circuit in server, a cellular network device, or other network device.

The term processor and memory may comprise but are not limited to in this application: (1) one or more microprocessors, (2) one or more processor(s) with accompanying digital signal processor(s), (3) one or more processor(s) without accompanying digital signal processor(s), (3) one or more special-purpose computer chips, (4) one or more field-programmable gate arrays (FPGAS), (5) one or more controllers, (6) one or more application-specific integrated circuits (ASICS), or detector(s), processor(s) (including dual-core and multiple-core processors), digital signal processor(s), controller(s), receiver, transmitter, encoder, decoder, memory (and memories), software, firmware, RAM, ROM, display, user interface, display circuitry, user interface circuitry, user interface software, display software, circuit(s), antenna, antenna circuitry, and circuitry.

The invention claimed is:

1. A method performed as a result of execution of computer program instructions by at least one data processor, the method comprising:
    obtaining, by a serving base station, information of a predetermined symbol period in a given subframe for starting backhaul downlink transmissions from the serving base station to a plurality of served relay nodes;
    determining at least one candidate symbol period during which at least one but not all of the served relay nodes can receive the backhaul downlink transmission from the serving base station, wherein the candidate symbol period is in the given subframe before the predetermined symbol period; and
    generating and sending at least one backhaul downlink symbol to the at least one of the served relay nodes in the at least one candidate symbol period;
    wherein the given subframe in each served relay node comprises a first part and a second part, the first part being at least for transmitting control signalling symbols to user equipment and the second part being at least for reception of the backhaul downlink transmission from the serving base station;
    wherein the at least one backhaul downlink symbol comprises at least one of a relay-physical downlink control channel data and a relay-physical downlink shared channel data; and
    wherein the given subframe has a frame structure for a multimedia broadcast single frequency network within a relay network.

2. The method as claimed in claim 1, wherein determining at least one candidate symbol period comprises receiving a candidate symbol report.

3. The method as claimed in claim 2, further comprising: generating a candidate symbol report trigger.

4. The method as claimed in claim 1, further comprising: generating an indicator for the at least one backhaul downlink symbol.

5. A method comprising:
    obtaining, by a relay node among a plurality of relay nodes served by a same serving base station, information of a predetermined symbol period in a given subframe for the relay nodes to start receiving backhaul downlink transmissions from the serving base station;
    determining at least one candidate symbol period during which the relay node can receive the backhaul downlink transmission from the serving base station, wherein the candidate symbol period is in the given subframe before the predetermined symbol period; and
    configuring the relay node to receive at least one backhaul downlink symbol from the serving base station in the at least one candidate symbol period;
    wherein the given subframe in each served relay node comprises a first part and a second part, the first part being at least for transmitting control signalling symbols to user equipment and the second part being at least for reception of the backhaul downlink transmission from the serving base station;
    wherein the at least one backhaul downlink symbol comprises at least one of a relay-physical downlink control channel data and a relay-physical downlink shared channel data and
    wherein the given subframe has a frame structure for a multimedia broadcast single frequency network within a relay network.

6. The method as claimed in claim 5 further comprising generating a candidate symbol report, wherein the candidate symbol report indicates at least one candidate symbol period, and sending the candidate symbol report to the serving base station.

7. The method as claimed in claim 6, further comprising receiving a report trigger prior to generating the candidate symbol report.

8. The method as claimed in claim 5, further comprising:
    receiving over a first time period a first group of symbols; and
    transmitting over a second time period a second group of symbols;
    wherein the second group of symbols are transmitted with symbols misaligned with the received symbols wherein the misalignment is equal to or greater than a switching time period.

9. The method as claimed in claim 8, wherein the switching time period comprises one of at least:
    a Tx-to-Rx switching period; and
    a Rx-to-Tx switching period.

10. The method as claimed in claim 8, further comprising: delaying the transmitting of the second group of symbols by the switching time period.

11. The method as claimed in claim 8, further comprising: advancing in time the timing of the transmitting of the second group of symbols by the switching time period.

12. An apparatus comprising at least one processor and at least one memory including computer program code the at least one memory and the computer program code configured to, with the at least one processor, cause the apparatus at least to perform:
    obtaining information of a predetermined symbol period in a given subframe for starting backhaul downlink transmissions from a serving base station to a plurality of served relay nodes;
    determining at least one candidate symbol period during which at least one but not all of the served relay nodes can receive the backhaul downlink transmission from the serving base station, wherein the candidate symbol period is in the given subframe before the predetermined symbol period; and generating and causing sending of at least one backhaul downlink symbol to the at least one of the served relay nodes in the at least one candidate symbol period;

wherein the given subframe in each served relay node comprises a first part and a second part, the first part being at least for transmitting control signalling symbols to user equipment and the second part being at least for reception of the backhaul downlink transmission from the serving base station;

wherein the at least one backhaul downlink symbol comprises at least one of a relay-physical downlink control channel data and a relay-physical downlink shared channel data; and wherein the given subframe has a frame structure for a multimedia broadcast single frequency network within a relay network.

13. The apparatus as claimed in claim 12, wherein determining at least one candidate symbol period comprises receiving a candidate symbol report.

14. The apparatus as claimed in claim 13, the at least one memory and the computer program code configured to, with the at least one processor, cause the apparatus at least to further perform:

generating a candidate symbol report trigger.

15. The apparatus as claimed in claim 12, the at least one memory and the computer program code configured to, with the at least one processor, cause the apparatus at least to further perform generating an indicator for the at least one backhaul downlink symbol.

16. An electronic device comprising apparatus as claimed in claim 12.

17. A chipset comprising apparatus as claimed in claim 12.

18. An apparatus comprising at least one processor and at least one memory including computer program code, the apparatus being a relay node or included in a relay node among a plurality of relay nodes served by a same serving base station, the at least one memory and the computer program code configured to, with the at least one processor, cause the apparatus at least to perform the following:

obtaining information of a predetermined symbol period in a given subframe for the relay nodes to start receiving backhaul downlink transmissions from the serving base station;

determining at least one candidate symbol period during which the relay node can receive the backhaul downlink transmission from the serving base station, wherein the candidate symbol period is in the given subframe before the predetermined symbol period; and configuring the relay node to receive at least one backhaul downlink symbol from the serving base station in the at least one candidate symbol period;

wherein the given subframe in each served relay node comprises a first part and a second part, the first part being at least for transmitting control signalling symbols to user equipment and the second part being at least for reception of the backhaul downlink transmission from the serving base station;

wherein the at least one backhaul downlink symbol comprises at least one of a relay-physical downlink control channel data and a relay-physical downlink shared channel data and wherein the given subframe has a frame structure for a multimedia broadcast single frequency network within a relay network.

19. The apparatus as claimed in claim 18, the at least one memory and the computer program code configured to, with the at least one processor, cause the apparatus at least to further perform generating a candidate symbol report, wherein the candidate symbol report indicates at least one candidate symbol period, and sending the candidate symbol report to the serving base station.

20. The apparatus as claimed in claim 19, the at least one memory and the computer program code configured to, with the at least one processor, cause the apparatus at least to further perform receiving a report trigger prior to generating the candidate symbol report.

21. The apparatus as claimed in claim 18, the at least one memory and the computer program code configured to, with the at least one processor, cause the apparatus at least to further perform:

receiving over a first time period a first group of symbols; and transmitting over a second time period a second group of symbols;

wherein the second group of symbols are transmitted with symbols misaligned with the received symbols wherein the misalignment is equal to or greater than a switching time period.

22. The apparatus as claimed in claim 21, wherein the switching time period comprises one of at least:

a Tx-to-Rx switching period; and a Rx-to-Tx switching period.

23. The apparatus as claimed in claim 21, the at least one memory and the computer program code configured to, with the at least one processor, cause the apparatus at least to further perform delaying the transmitting of the second group of symbols by the switching time period.

24. The apparatus as claimed in claim 21, the at least one memory and the computer program code configured to, with the at least one processor, cause the apparatus at least to further perform advancing in time the transmitting o f the second group of symbols by the switching time period.

25. A non-transitory computer-readable medium encoded with instructions that, when executed by a computer, execute a method that comprises:

obtaining, by a serving base station, information of a predetermined symbol period in a given subframe for starting backhaul downlink transmissions from the serving base station to a plurality of served relay nodes;

determining at least one candidate symbol period during which at least one but not all of the served relay nodes can receive the backhaul downlink transmission from the serving base station, wherein the candidate symbol period is in the given subframe before the predetermined symbol period; and generating and sending at least one backhaul downlink symbol to the at least one of the served relay nodes in the at least one candidate symbol period;

wherein the given subframe in each served relay node comprises a first part and a second part, the first part being at least for transmitting control signalling symbols to user equipment and the second part being at least for reception of the backhaul downlink transmission from the serving base station;

wherein the at least one backhaul downlink symbol comprises at least one of a relay-physical downlink control channel data and a relay-physical downlink shared channel data; and wherein the given subframe has a frame structure for a multimedia broadcast single frequency network within a relay network.

26. A non-transitory computer-readable medium encoded with instructions that, when executed by a computer, execute a method that comprises obtaining, by a relay node among a plurality of relay nodes served by a same serving base station, information of a predetermined symbol period in a given subframe for the relay nodes to start receiving backhaul downlink transmissions from the serving base station;
- determining at least one candidate symbol period during which the relay node can receive the backhaul downlink transmission from the serving base station, wherein the candidate symbol period is in the given subframe before the predetermined symbol period; and
- configuring the relay node to receive at least one backhaul downlink symbol from the serving base station in the at least one candidate symbol period;
- wherein the given subframe in each served relay node comprises a first part and a second part, the first part being at least for transmitting control signalling symbols to user equipment and the second part being at least for reception of the backhaul downlink transmission from the serving base station;
- wherein the at least one backhaul downlink symbol comprises at least one of a relay-physical downlink control channel data and a relay-physical downlink shared channel data; and
- wherein the given subframe has a frame structure for a multimedia broadcast single frequency network within a relay network.

27. An apparatus comprising at least one processor and at least one memory including computer program code, the at least one memory and the computer program code configured to, with the at least one processor, implement:
- a symbol information obtainer configured to obtain information of a predetermined symbol period in a given subframe for starting backhaul downlink transmissions from a serving base station to a plurality of served relay nodes;
- a candidate symbol period determiner configured to determine at least one candidate symbol period during which at least one but not all of the served relay nodes can receive the backhaul downlink transmission from the serving base station, wherein the candidate symbol period is in the given subframe before the predetermined symbol period; and
- a backhaul downlink symbol generator and a transmitter configured to generate and to send at least one backhaul downlink symbol to the at least one o f the served relay nodes in the determined at least one candidate symbol period;
- wherein the given subframe in each served relay node comprises a first part and a second part, the first part being at least for transmitting control signalling symbols to user equipment and the second part being at least for reception of the backhaul downlink transmission from the serving base station;
- wherein the at least one backhaul downlink symbol comprises at least one of a relay-physical downlink control channel data and a relay-physical downlink shared channel data and
- wherein the given subframe has a frame structure for a multimedia broadcast single frequency network within a relay network.

28. An apparatus comprising at least one processor and at least one memory including computer program code, the at least one memory and the computer program code configured to, with the at least one processor, implement, in a relay node that is one of a plurality of relay nodes served by a same serving base station:
- a symbol period obtainer configured to obtain information of a predetermined symbol period in a given subframe for the relay nodes to start receiving backhaul downlink transmissions from the serving base station;
- a candidate symbol period determiner configured to determine at least one candidate symbol period during which the relay node can receive the backhaul downlink transmission from the serving base station, wherein the candidate symbol period is in the given subframe before the predetermined symbol period; and
- a backhaul downlink symbol receiver configured to receive at least one backhaul downlink symbol from the serving base station in the at least one candidate symbol period;
- wherein the given subframe in each served relay node comprises a first part and a second part, the first part being at least for transmitting control signalling symbols to user equipment and the second part being at least for reception of the backhaul downlink transmission from the serving base station;
- wherein the at least one backhaul downlink symbol comprises at least one of a relay-physical downlink control channel data and a relay-physical downlink shared channel data and
- wherein the given subframe has a frame structure for a multimedia broadcast single frequency network within a relay network.

\* \* \* \* \*